United States Patent

[11] 3,620,834

[72] Inventor James J. Duffy
Tonawanda, N.Y.
[21] Appl. No. 745,663
[22] Filed July 18, 1968
[45] Patented Nov. 16, 1971
[73] Assignee Hooker Chemical Corporation
Niagara Falls, N.Y.

[54] METAL PLATING OF SUBSTRATES
17 Claims, No Drawings

[52] U.S. Cl. .......... 117/213, 117/47, 117/118, 117/227, 204/20, 204/30, 204/38
[51] Int. Cl. .......... C23b 5/62, C23f 17/00
[50] Field of Search .......... 117/213, 47 R, 47, 35 S, 118, 227; 204/19, 20, 30, 38

[56] References Cited

UNITED STATES PATENTS

| | | | |
|---|---|---|---|
| 2,551,342 | 5/1951 | Scholl .......... | 204/30 |

FOREIGN PATENTS

| | | | |
|---|---|---|---|
| 145 | 1861 | England .......... | 204/30 |
| 696,746 | 9/1940 | Germany .......... | 204/20 |
| 892,149 | 3/1962 | England .......... | 204/20 |

*Primary Examiner*—William L. Jarvis
*Attorneys*—Peter F. Casella, Donald C. Studley, Richard P. Mueller and James F. Mudd

ABSTRACT: Various substrates, such as cellulosic, ceramic and plastic materials, are plated with metals by a process which comprises subjecting a substrate to a compound selected from the group consisting of $AsCl_3$, $SbCl_3$ and $PCl_3$, and thereafter subjecting the thus-treated substrate to a source of sulfide such as aqueous $H_2S$. The resulting treated substrate can be electroplated by conventional techniques.

METAL PLATING OF SUBSTRATES

BACKGROUND OF THE INVENTION

There is a rapidly increasing demand for metal-plated articles, for example, in the production of low-cost plastic articles that have a metallic appearance. Such articles are in demand in such industries as automotive, home appliance, radio and television and for use in decorative containers and the like. Heretofore, the metal plating of materials such as plastics has required many process steps.

It is an object of this invention to provide a simple process for the metal plating of various substrates. It is also an object of this invention to provide articles having an adherent metal coating that is resistant to peeling, temperature cycling, and corrosion. Such coatings are electrically conductive whereby static charges are readily dissipated from the surfaces of the substrate. Such conductive surfaces are useful in printed circuits. The metal coatings further serve to protect articles, especially plastics, from abrasion, scratching and marring to reduce their porosity and to improve their thermal conductivity and resistance to impact. Other objects will become apparent from the following detailed description of the preferred embodiments of the invention.

SUMMARY OF THE INVENTION

This invention relates to metal plating of substrates. More particularly, this invention relates to metal plating of substrates by a process which comprises subjecting a substrate to a compound selected from the group consisting of $AsCl_3$, $SbCl_3$ and $PCl_3$, and thereafter subjecting the thus-treated substrate to a source of sulfide. The resulting substrate is electroless plated and/or electroplated by conventional means to deposit an adherent metal coating on the substrate.

DESCRIPTION OF THE PREFERRED EMBODIMENTS

The process of this invention is applicable to substrates, such as plastics and to other substantially nonmetallic substrates. Suitable substrates include, but are not limited to, cellulosic and ceramic material such as cloth, paper, wood, cork, cardboard, clay, porcelain, leather, porous glass, asbestos cement, and the like.

Typical plastics to which the process of this invention is applicable include the homopolymers and copolymers of ethylenically unsaturated aliphatic, alicyclic and aromatic hydrocarbons such as polyethylene, polypropylene, polybutene, ethylene-propylene copolymers; copolymers of ethylene or propylene with other olefins. polybutadiene; polymers of butadiene, polyisoprene, both natural and synthetic, polystyrene and polymers of pentene, hexene, heptene, octene, 2-methylpropene, 4-methyl-hexene-1, bicyclo-(2.2.1)-2-heptene, pentadiene, hexadiene, 2,3-dimethylbutadiene-1,3, 4-vinylcyclohexene, cyclopentadiene, methylstyrene, and the like. Other polymers useful in the invention include polyindene, indenecoumarone resins; polymers of acrylate esters and polymers of methacrylate esters, acrylate and methacrylate resins such as ethyl acrylate, *n*-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; furan resins (furfuryl alcohol or furfural ketone); hydrocarbon resins from petroleum; isobutylene resins (polyisobutylene); isocyanate resins (polyurethanes); melamine resins such as melamine-formaldehyde and melamine-urea-formadehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, the polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alchohol, vinyl chloride, vinyl butyral, vinyl chloride-acetate copolymer, vinyl pyrrolidone and vinylidene chloride copolymer; polyformaldehyde; polyphenylene oxide; polymers of diallyl phthalates and phthalates; polycarbonates of phosgene or thiophosgene and dihydroxy compounds such as bis-phenols and epichlorohydrin (trade-named Phenoxy polymers); graft copolymers and polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the trade name of Kydex 100.

The polymers of the invention can be used in the unfilled condition, or with fillers such as glass fiber, glass powder, glass beads, asbestos, talc and other mineral fillers, wood flour and other vegetable fillers, carbon in its various forms, dyes, pigments, waxes and the like.

The substrates of the invention can be in various physical forms, such as shaped articles, for example, moldings, sheets, rods, and the like; fibers, films and fabrics, and the like.

In the first step of the preferred process of the invention, the substrate is treated with an acid chloride selected from the group consisting of $AsCl_3$, $SbCl_3$ and $PCl_3$. These compounds can be employed in the liquid or vapor phases or can be dissolved in a solvent. Suitable solvents or diluents for the arsenic trichloride, antimony trichloride or phosphorus trichloride are nonaqueous inert solvents that dissolve the compound and which preferably swell the surface of a plastic without detrimentally affecting the surface of the plastic. Such solvents include the halogenated hydrocarbons and halocarbons such as chloroform, methylchloroform, phenylchloroform, dichloroethylene, trichloroethylene, perchloroethylene, trichloroethane, dichloropropane, ethyldibromide, ethylchlorobromide, propylenedibromide, monochlorobenzene, monochlorotoluene, and the like; aromatic hydrocarbons such as benzene, toluene, xylene, ethylbenzene, naphthalene and the like; dialkylamides of 1 to 18 carbon atoms such as dimethylformamide, diethylformamide, dipropylamide and the like; dimethylsulfoxide; tetrahydrofuran; ethyl ether; and the like solvents apparent to those skilled in the art.

When a solution of the acid chloride compound is employed in the process, the solution concentration is generally in the range from about 0.0001 weight percent of the compound based on the weight of the solution up to a saturated solution, and preferably from about 5 to about 70 percent. Prior to contacting the substrate with the acid chloride compound, as a gas, liquid or in solution, the surface of the substrate should be clean. When a solution is used, the solvent generally serves to clean the surface. A solvent wash may be desirable when gaseous or liquid trichloride is employed. However, it is not necessary to subject the surface of the substrate to special treatment such as etching, polishing and the like. The acid chloride treatment is generally conducted at a temperature below the softening point of the substrate and below the boiling point of the solvent, if a solvent is used. Generally the temperature is in the range of about 0° to about 135° C., but preferably in the range of about 0° to about 100° C. The contact time varies depending on the nature of the substrate, the solvent, and temperature, but generally is in the range of about 1 second to 1 hour or more, preferably in the range of about 1 to 10 minutes.

Following the first treatment step, the substrate can be rinsed with a suitable washing agent, such as the nonaqueous inert solvents described hereinbefore, and then can be dried by merely exposing the surface to the atmosphere or to nonoxidizing atmospheres such as nitrogen, carbon dioxide, and the like or by drying the surface with radiant heaters or in a conventional even. Drying times can vary considerably, for example from 1 second to 30 minutes or more, preferably 5 seconds to 10 minutes. The washing and drying steps are optional and either or both may be eliminated, although the rinsing step is preferred.

In the second treatment step of the process of the invention, the $AsCl_3$-, $SbCl_3$- or $PCl_3$-treated substrate is subjected to a source of a sulfide. Typical sulfide-yielding substances include hydrogen sulfide, the alkali metal sulfides such as $Na_2S$, $K_2S$, and $Li_2S$; alkali metal hydrosulfides such as NaHS, KHS and LiHS; and the like. The sulfide-yielding compounds can be utilized in the vapor phase, as a liquid or dissolved in a solvent such as water. When a solution is employed in the process, the solution concentration is generally in the range from about 0.001 weight percent sulfide-yielding substance based on the weight of the solution up to a saturated solution, and preferably from about 10 to about 70 percent.

The sulfide treatment is generally conducted at a temperature below the softening point of the substrate and below the boiling point of the solvent, if a solvent is used. Generally the temperature is in the range of about 0° to about 135° C., but preferably in the range of 15° to about 50° C. The contact time varies depending on the nature of the substrate, the solvent and temperature, but is generally in the range of 1 second to 5 minutes or more, and preferably in the range of about 1 to 120 seconds.

Following the treatment with the source of sulfide, the substrate can be rinsed and/or dried as described hereinbefore. The washing and drying steps are optional, although the rinsing step is preferred.

The treated substrates can be electroless plated and/or electroplated directly after the second treatment step of this invention or they can be stored for later use. In a typical electroless plating or chemical plating process, a catalytic surface is contacted with a solution of a metal salt under conditions in which the metallic ion of the metal salt is reduced to the metallic state and deposited on the catalytic surface. A suitable chemical treating bath for the deposition of a nickel coating on the catalytic surface produced in accordance with the process of this invention can comprise, for example, a solution of a nickel salt in an aqueous hypophosphite solution. Suitable hypophosphites include the alkali metal hypophosphites such as sodium and potassium hypophosphite, and the alkaline earth metal hypophosphites such as calcium and barium hypophosphites. Other suitable metal salts for use in the chemical treating bath include the salts of metals found in Groups IB, IIB, IVB, VB, VIB, VIIB and VIII of the Periodic Table appearing on pages 60–61 of Lange's Handbook of Chemistry (Revised Tenth Edition). Other reducing media include formaldehyde, hydroquinone and hydrazine. Other agents, such as buffering agents, complexing agents, and other additives are included in the chemical plating solutions or baths.

The sulfide-treated substrates can be electroplated by processes known in the art. The treated article is generally used as the cathode and the metal desired to be plated is generally dissolved in an aqueous plating bath although other media can be employed. Generally, a soluble metal anode of the metal to be plated can be employed. In some instances, however, a carbon anode or other inert anode is used. Suitable metals, solutions and conditions for electroplating are described in Metal Finishing Guidebook Directory for 1967, published by Metals and Plastics Publications, Inc., Westwood, New Jersey.

The following examples serve to illustrate the invention but are not intended to limit it. In this specification and claims, unless otherwise specified, all temperatures are in degrees centigrade and all parts are understood to be expressed in parts by weight.

Example 1

Polypropylene was immersed in arsenic trichloride, maintained at 70° C. for 5 minutes, and then washed with an acetone spray for 2 seconds. Thereafter the polypropylene was immersed in a 20-percent solution of $H_2S$ in water at 40° C. for 3 minutes. The polypropylene was washed with water and electroplated with semibright nickel to produce an adherent nickel coating on the surface of the polypropylene.

A typical semibright nickel electroplating bath used in the examples comprised 1,100 grams of $NiSO_4 \cdot 6H_2O$, 132 grams of $NiCl_2 \cdot 6H_20$, 132 grams of boric acid, 2.31 grams of Harshaw Perflow Addition Agent, 17.5 ml. of Harshaw Perflow 110, 5.25 ml. of 37-percent formaldehyde and 3.5 liters of water. Nickel electrodes were used; the bath was maintained at about 75° C. and air agitated; and a current density of about 50 to about 70 amps/ft.$^2$ was employed.

Example 2

Two samples of ABS were immersed in a 35-percent solution of arsenic trichloride in perchloroethylene maintained at 60° C. for 6 minutes. Thereafter the samples were washed with perchloroethylene for 2 seconds and immersed in a 20-percent solution of $H_2S$ and water at 50° C. for 5 minutes. The resulting ABS samples were washed with water. One sample was electroless plated with nickel and the other sample electroless plated with copper to give adherent nickel and copper coatings on the surface of the samples. The copper electroless plating solution contained 7.5 grams of cupric nitrate, 5 grams of sodium bicarbonate, 15 grams of potassium sodium tartrate, 10 grams of NaOH, 50 ml. of 37-percent formaldehyde and 450 ml. of water. The nickel electroless plating solution contained 17 grams of $NiSO_4 \cdot 6H_2O$, 5 grams of sodium citrate, 5 grams of sodium acetate, 7.5 grams of $NaH_2PO_4 \cdot H_2O$, 10 grams of $MgSO_4$ and 500 ml. of water.

Example 3

A sample of polycarbonate was subjected to $SbCl_3$ at 30° C. for 1 minute and then washed with acetone for 2 seconds. After being immersed in a 25-percent solution of $H_2S$ in water at 30° C. for 3 minutes, the polycarbonate sample was electroplated to produce an adherent nickel plate on the surface of the sample.

Example 4

Polypropylene was immersed in $PCl_3$, maintained at 50° C. for 8 minutes and then washed with a water spray. The sample was thereafter exposed to gaseous $H_2S$ for 10 minutes at 27° C., rinsed with acetone and electroplated with nickel to give an adherent nickel plate on the surface of the plastic.

Examples 5–28

Various substrates (in triplicate) were subjected to the acid chloride and then aqueous $H_2S$. The substrates, acid chlorides, times and temperatures are given in table 1. One sample of each substrate was electroless plated with nickel, the second sample was electroless plated with copper and the third sample was electroplated with nickel to form adherent, bright smooth coatings on the surfaces of the samples.

Example 29

All of the plated samples of examples 5–28 were subjected to a thermocycle test which consisted of placing the samples in a circulating air oven at 80° C. for 2 hours, then standing one-half hour at 25° C., standing at −30° C., for 1 hour and standing one-half hour at 25° C. The foregoing constituted one cycle. Examination of the samples at the end of five cycles showed no loss of adherence in any of the samples.

| Example | Substrate | Acid chloride | Temperature, ° C., time/minutes | Aqueous $H_2S$ temperature, ° C., time/minutes | Comments |
|---|---|---|---|---|---|
| 5 | Polypropylene | $SbCl_3$ | 80/5 | 25/3 | |
| 6 | do | $AsCl_3$ | 70/7 | 25/3 | |
| 7 | do | $PCl_3$ | 70/12 | 25/3 | |
| 8 | Polycarbonate (Lexan) | 20% $PCl_3$ in perchloroethylene | 70/3.5 | 25/3 | |
| 9 | do | 10% $AsCl_3$ in perchloroethylene | 70/1.5 | 25/3 | |
| 10 | ABS | $SbCl_3$ | 80/1 | 25/3 | |
| 11 | ABS | $AsCl_3$ | 70/3 | 25/3 | |
| 12 | ABS | $PCl_3$ | 70/5 | 25/3 | |
| 13 | ABS | 10% $AsCl_3$ in perchloroethylene | 25/5 | 25/3 | |
| 14 | Polyester of ethylene glycol and terephthalic acid | $SbCl_3$ | 85/2.5 | 50/3 | |
| 15 | do | $AsCl_3$ | 60/5 | 50/3 | |
| 16 | do | $PCl_3$ | 60/9 | 50/3 | |
| 17 | Nylon | 10% $AsCl_3$ in perchloroethylene | 25/12 | 30/3 | Perchloroethylene wash between treatments. |
| 18 | do | $AsCl_3$ | 35/0.5 | 30/5 | |
| 19 | Polyacetal (Delrin) | $AsCl_3$ | 65/3 | 30/5 | |
| 20 | do | $SbCl_3$ | 65/1 | 30/5 | |
| 21 | do | 10% $AsCl_3$ in perchloroethylene | 60/4 | 50/3 | Do. |
| 22 | do | $PCl_3$ | 70/8 | 30/3 | |
| 23 | Acrylic (Plexiglas) | 10% $AsCl_3$ in perchloroethylene | 30/1 | 30/3 | |
| 24 | Polystyrene | do | 45/1.5 | 30/3 | Do. |
| 25 | Polyethylene | $SbCl_3$ | 80/3 | 30/5 | |
| 26 | do | $AsCl_3$ | 70/5 | 30/5 | |
| 27 | do | $PCl_3$ | 70/8 | 30/5 | |
| 28 | do | $AsCl_3$ | 25/5 | 30/5 | |

Various changes and modifications can be made in the process and products of this invention without departing from the spirit and scope thereof. The various embodiments of the invention disclosed herein serve to further illustrate the invention but are not intended to limit it.

What is claimed is:

1. A process consisting essentially of subjecting a substrate to an acid chloride selected from the group consisting of arsenic trichloride, antimony trichloride and phosphorus trichloride, subjecting the acid-chloride-treated substrate to a source of sulfide and thereafter metal plating the thus-treated substrate.

2. The process of claim 1 wherein the sulfide-treated substrate is electroless plated.

3. The process of claim 2 wherein the electroless-plated substrate is electroplated.

4. The process of claim 1 wherein the sulfide-treated substrate is electroplated.

5. The process of claim 3 wherein the source of sulfide is selected from hydrogen sulfide, alkali metal sulfide and alkali metal hydrosulfide.

6. The process of claim 5 wherein the source of sulfide is aqueous hydrogen sulfide.

7. The process of claim 6 wherein the source of sulfide is gaseous hydrogen sulfide.

8. The process of claim 6 wherein the substrate is plastic.

9. The process of claim 8 wherein the plastic is polypropylene.

10. The process of claim 8 wherein the plastic is a graft copolymer of polybutadiene, styrene and acrylonitrile.

11. An article produced by the process of claim 1.

12. The article of claim 11 having an adherent metal coating deposited on the treated surface of the article by electroless plating.

13. The article of claim 12 having an adherent metal coating electrolytically deposited on the electroless metal coating.

14. The article of claim 11 having an adherent metal coating electrolytically deposited on the treated surface of the article.

15. The article of claim 13 wherein the substrate is a plastic.

16. The article of claim 15 wherein the plastic is polypropylene.

17. The article of claim 15 wherein the plastic is a graft copolymer of polybutadiene, styrene and acrylonitrile.

* * * * *